Patented Jan. 28, 1947

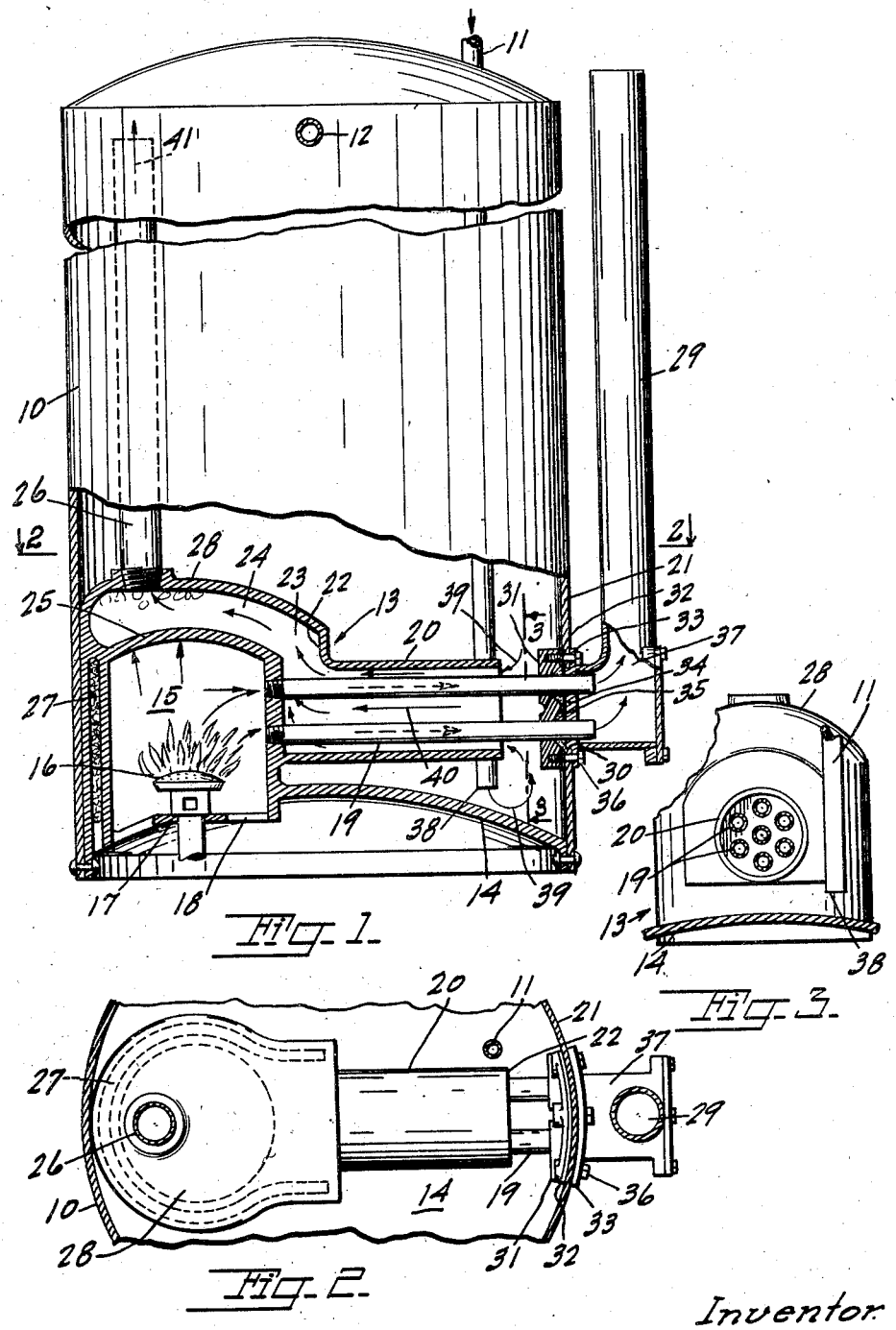

2,414,875

UNITED STATES PATENT OFFICE 2,414,875

WATER HEATER

Wilford P. Horne, Richmond, Calif.

Application July 31, 1945, Serial No. 607,934

5 Claims. (Cl. 122—17)

This invention, a water heater, is a new ebullition type of water heater, one which operates with maximum efficiency, both, as to the proportion of total heat transferred, and as to rapidity of heating and circulation. It involves a new principle in heating water for domestic or commercial uses and provides hot water almost instantly after the fire has been started. The efficiency can be increased to such an extent that forced draft may be required to carry away the products of combustion, for which reason certain circulatory parts are limited in area, because forced draft is undesirable particularly in domestic installations. These parts include the fire tubes and the sleeve therefor.

In conventional water heaters, the water is usually passed through a coiled tube with the fire acting on the coils, or, in large installations for commercial uses, the hot water is sometimes provided by conventional water-tube or fire-tube boilers. In all cases pure circulation is responsible for the heating, even including the "instantaneous" type of water heater.

This invention circulates the water by ebullition, preheating the cold water through the medium of fire-tubes within a passage, and then circulating the pre-heated water to a higher lever and higher temperature zone for final heating to the boiling point to create rapid circulation through a vertical tube or riser to the top of the tank.

The objects and advantages of the invention are as follows:

First, to provide a water heater of maximum efficiency as related to heat transfer and rapidity of heating.

Second, to provide a water heater in which circulation of the water for heating is produced through ebullition.

Third, to provide a water heater in which cold water flows countercurrent to the heat and is finally heated to maximum temperature at the point of greatest heat and then transmitted to the top of the water column by boiling of the water in a plane above that of the initial heating.

Fourth, to provide a water heater in which cold water is initially heated in a flow countercurrent to the heat and thence directed to an elevated plane for final heating and therefrom directed to the top of the water column.

Fifth, to provide a water heater with a fire or heating chamber with lateral flues leading therefrom and with a path for water surrounding the flues and leading toward the heating chamber and thence circulating over the top for maximum heating and being ejected upwardly therefrom to the top of the water column through the intense final heat of the water.

In describing the invention reference will be made to the accompanying drawing, in which:

Fig. 1 is a sectional side elevation of the invention as installed in a tank which is partly shown in section.

Fig. 2 is a section taken on line 2—2 of Fig. 1.

Fig. 3 is a section taken on line 3—3 of Fig. 1.

The invention can be installed in any suitable receptacle, in an open tank, or in a closed tank such as a conventional hot-water tank 10 and having a cold-water inlet 11 and a hot-water outlet 12.

Though the heating unit 13 is illustrated as formed integral with the bottom of the tank, the construction is not so limited, it being possible, as is perfectly obvious, to mount the heating unit on the bottom with a passage provided for the burner.

As illustrated, the heating unit is cast integral with the bottom 14 of the tank and consists of a fire chamber 15 in which is located a gas burner 16 suitably supported as indicated at 17 and with the support provided with air passages 18. Fire-tubes 19 open into one side of the fire chamber, being shown as threadedly secured in the wall, and these fire-tubes are encompassed by a sleeve or conduit 20 which extends the greater part of the distance to the opposite wall 21 of the tank, sufficient space being left for passage of water from the tank into the end of the sleeve, and with the sleeve terminating in spaced relation to the outside of the wall of the fire chamber as indicated at 22 to provide an upflow water chamber. This sleeve may be formed integral with the fire chamber as shown, or may consist of a section of pipe threadedly secured in position.

The passage or chamber 23 formed between the inner end of the sleeve and the wall of the fire chamber opens directly into the ebullition chamber 24, formed over the crown plate 25 of the heating chamber, and this ebullition chamber is provided with a hot-water riser 26 at its highest and most remote point as related to the inlet end of the sleeve 20.

The fire chamber side walls are thoroughly insulated as indicated at 27 to supply maximum heat to the fire-tubes and minimize heating of the water in the lower part of the tank to maintain a high temperature differential for rapid circulation, and for maximum water heating speed. The crown 28 of the ebullition chamber can also be insulated, though for conventional installations the speed of heating is ample without the latter insulation.

Though the flue 29 for the fire chamber could readily be installed within the tank, extending through the top, it is preferably mounted outside the tank as shown, thus permitting replacement of the fire-tubes should it be found advisable at any time.

A sufficiently large hole 30 is formed through the side wall of the tank to provide access to the interior, and the sealing means for this hole and for the tubes is illustrated as consisting of an inside flange 31 and gasket 32, and an outside flange 33 which has a pilot 34 to fit in the hole in the side wall, and metallic or other suitable packing rings 35 which are compressed between the inside face of the pilot and the walls of the conical recesses in the inside flange as shown, the two flanges being bolted together with interposed tank wall by studs or cap screws 36, which are readily sealed by the gasket, the threaded passages for the studs or cap screws passing only part way through the flange so as not to provide a leakage point. The flue elbow 37 is preferably formed integral with the outside flange.

As is readily apparent, when the heating unit is being installed, the tubes 19 can be pre-assembled and inserted through the opening 30 when the bottom 14 is assembled with the tank, the inside flange and its gasket being supported on the flues. The inside flange can then be drawn to the opening by means of a threaded rod passing through one of the cap-screw holes in the tank wall and drawn against the wall. Rings of packing 35 are then slipped over the ends of the pipes, and the outside flange then slipped onto the rod and up against the side of the tank, the screws then inserted and drawn up tight, which compresses the packing against the walls of the tubes.

If it is necessary at any time to replace the packing, it is easily done from the outside of the tank, by removing the outside flange. Obviously the gasket could also be located between the outside flange and the outside of the tank wall, though it is readily replaceable by removing the outside flange and the tubes, and the tubes are replaceable by removing the outside flange and unscrewing and replacing them one at a time, or if all are removed before any are substituted, the hole in the side is sufficiently large to hold the inside flange and start one of the tubes through, after which the rest are easily inserted.

As will be observed, there is a nest of fire-tubes within the sleeve, to provide suitable draft, and maximum heat transfer, the length of the sleeve and the area of the tubes being arranged so as to leave sufficient heat to create a natural draft in the flue 29, except where forced draft is not considered undesirable.

Fresh cold water enters through the pipe 11 which extends nearly to the bottom of the tank as indicated at 38, with the hot water being taken off at the top at 12, the water level in the tank being maintained through the pipe 11 as it is drawn off through the pipe 12. The water in the lower portion of the tank passes into the end of the sleeve 20 as indicated at 39 thence along the hot tubes 19 as indicated at 40, thence up through the passage 23 into the ebullition chamber 24 over the crown 25 of the heating chamber thence into the riser 26 from the top of which it is discharged as indicated at 41, the water first contacting the coolest portions of the fire flues and being gradually subjected to greater and greater heat as the water reaches the fire chamber walls, being further heated as it passes up through the passage 23 and brought to the boiling point in the chamber 24, thus providing rapid flow of hot water up through the riser 26; at the same time the hot gases from the burner flow through the fire-tubes in the opposite direction as indicated by the flow arrows, and pass out through the flue 29.

As is readily apparent, this water heater is not limited to gas firing, other fuels can be used in the fire chamber, by providing proper burners or grates, and it can also be used with electric heating elements—elongated elements to replace the fire-tubes—and a crown heating element to replace the crown of the fire chamber, or heating elements within the fire-tubes and against the underside of the crown 25.

I claim:

1. A water heater comprising; a tank; a fire chamber located in the lower portion of said tank and having a plurality of fire flues extending from one side, heating means in said fire chamber and a crown for the top thereof, an ebullition chamber located above said fire chamber with said crown forming the bottom thereof and having a crown and a riser extending upwardly from the highest portion thereof; a sleeve surrounding said fire flues throughout a portion of their length and having an inlet at one end; an upward passage extending from the other end of said sleeve and communicating with said ebullition chamber, and a flue into which said fire flues discharge.

2. A structure as defined in claim 1; said sleeve and said fire flues being confined to one side of said fire chamber with the other sides insulated against transfer of heat to surrounding water for maximum heating of water in the ebullition chamber.

3. A structure as defined in claim 1; said sleeve being cylindrical in form and having said plurality of fire flues extending therethrough; a passage for said fire flues formed through the side wall of said tank and having said flues extending therefrom, inside outside flanges including a gasket, packing means for each fire flue, means for securing the flanges with intervening wall together and simultaneously compressing said packing about said fire flues to provide a replaceable seal for the passage of said fire flues through the wall of said tank.

4. A water heater, in combination; a fire chamber having a superposed ebullition chamber and a riser therefor, and a water chamber formed down one side and in communication with said ebullition chamber; a water conduit extending laterally from said water chamber and in communication therewith; and fire flues heated from said fire chamber and longitudinally disposed in said conduit for initial heating of water, to flow through said water chamber to said ebullition chamber for final heating to the boiling point for ejection through said riser.

5. A structure as defined in claim 4; said fire chamber having a fuel burner therein and having side walls and a crown, with said crown simultaneously forming the bottom of said ebullition chamber, and said ebullition chamber having a crown with said riser extending from the highest point thereof; the sides of said fire chamber other than that occupied by said water chamber being insulated against heat transfer; means for sealing said fire-tubes through the side wall of a tank to prevent leakage of water, and a flue into which said fire flues discharge.

WILFORD P. HORNE.